United States Patent
Fujita (10) Patent No.: US 6,216,853 B1
(45) Date of Patent: Apr. 17, 2001

(54) TOOTHED CONVEYOR BELT AND COATING REMOVAL JIG FOR THE SAME

(75) Inventor: Norihisa Fujita, Osaka-fu (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/259,530

(22) Filed: Feb. 26, 1999

(30) Foreign Application Priority Data

Mar. 6, 1998 (JP) .................................................. 10-055292

(51) Int. Cl.[7] .................................................. B65G 15/34
(52) U.S. Cl. .................................................. 198/847
(58) Field of Search .................................. 198/846, 847

(56) References Cited

U.S. PATENT DOCUMENTS

| | | | |
|---|---|---|---|
| 2,712,332 | * | 7/1955 | Annerhed ............................. 198/847 |
| 2,748,044 | * | 5/1956 | Seiler ................................... 198/847 |
| 2,851,152 | * | 9/1958 | Olsson ................................. 198/847 |
| 5,328,023 | * | 7/1994 | Hinkelmann et al. ............... 198/847 |

FOREIGN PATENT DOCUMENTS

| | | |
|---|---|---|
| 155854 | 9/1932 | (CH) . |
| 1765432 | 4/1958 | (DE) . |
| 3590814 T1 | 6/1987 | (DE) . |
| 43 05 690 C1 | 6/1994 | (DE) . |
| 44 17 668 A1 | 11/1995 | (DE) . |
| 0 022 928A1 | of 1981 | (EP) . |
| 5731016 | 12/1980 | (JP) . |
| 58-207542 | 12/1983 | (JP) . |

* cited by examiner

Primary Examiner—James R. Bidwell
(74) Attorney, Agent, or Firm—Dann, Dorfman, Herrell and Skillman; Henry H. Skillman

(57) ABSTRACT

A toothed conveyor belt is composed of a flexible belt body and an elastically deformable steel belt. The flexible belt body conveys articles on the outer side thereof and has meshing teeth formed on the inner side thereof for meshing with a toothed pulley. The steel belt is embedded in the belt body and extends in the longitudinal direction of the belt body.

16 Claims, 10 Drawing Sheets

TOOTHED CONVEYOR BELT AND COATING REMOVAL JIG FOR THE SAME

BACKGROUND OF THE INVENTION

1. Field of the Invention

The present invention relates to a toothed conveyor belt which uses a steel belt as a reinforcement core, as well as to a coating removal jig for the toothed conveyor belt which functions to remove a coating from the conveyance-surface side of a belt end portion in order to expose the core for performing cut-and-joint operations on the toothed conveyor belt.

2. Description of the Related Art

Figure 11:
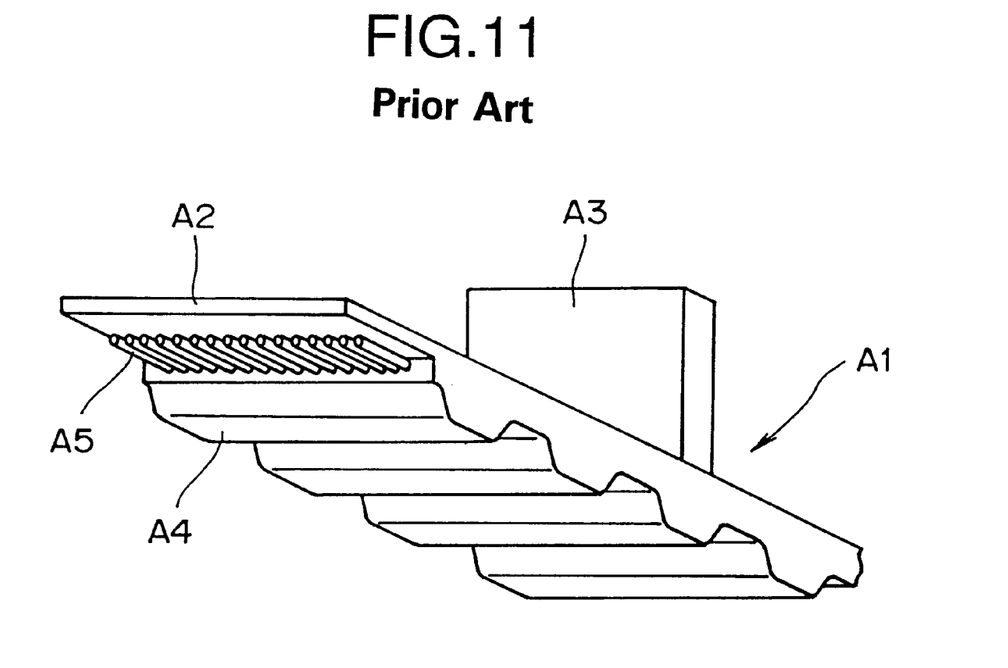
FIG. 11 is a partial perspective view showing a conventional toothed conveyor belt.

As shown in FIG. 11, a conventional toothed belt A1 for conveying articles is composed of a belt body A2 and conveyance attachments A3. The belt body A2 is molded from an elastic material such as rubber or polyurethane. The conveyance attachments A3 are provided on the outer side of the belt body A2 in order to hold articles from behind. Meshing teeth A4 are formed on the inner side of the belt body A2 and mesh with an unillustrated toothed pulley.

In order to improve the tensile strength of the toothed belt A1, a number of steel wires A5 serving as reinforcement cores and extending in the direction of conveyance are embedded in the toothed belt A1 in rows arranged widthwise.

Since the conventional toothed conveyor belt employs a number of steel wires as reinforcement cores, carrying out cut-and-joint operations at an arbitrary position on the belt is difficult. Bonding or fusing cut ends of the belt is not necessarily impossible, as described in Japanese Patent Application Laid-Open (kokai) No. 58-207542 and Japanese Patent Publication (kokoku) No. 57-31016. However, this method is not suitable for frequent cut-and-joint operations. Also, since cut ends of steel wires cannot be connected, a deterioration in tensile strength at a connected portion is unavoidable.

Also, since the conventional toothed conveyance belt employs, as reinforcement cores, steel wires embedded in rows arranged widthwise in the belt body, a restoration force for eliminating a twist about the direction of conveyance is poor. As a result, torsional vibration of the toothed belt tends to occur during conveyance of articles.

Further, since conveyance attachments are bonded onto or fused with the conveyance surface of the belt body, replacing conveyance attachments or altering their positions is impossible.

SUMMARY OF THE INVENTION

An object of the present invention is to solve the above-mentioned problems involved in the prior art and to provide a toothed conveyor belt which enables easy cut-and-joint operations without impairment of tensile strength and which permits replacement and positional alteration of conveyance attachments.

Another object of the present invention is to provide a coating removal jig for the toothed conveyor belt for carrying out cut-and-joint operations on the belt.

To achieve the above objects, the present invention provides a toothed conveyor belt comprising a flexible belt body and an elastically deformable steel belt. The belt body conveys articles on the outer side thereof and has meshing teeth formed on the inner side thereof for meshing with a toothed pulley. The steel belt is embedded in the belt body and extends in the longitudinal direction of the belt body.

Since the steel belt is used as a reinforcement core, the toothed conveyor belt has the advantages of improved flexibility, endurance to high tension, less elongation over long-term use, and high rigidity to torsional deformation.

As a result, the toothed belt assumes high endurance and can convey articles smoothly and stably.

Since the thin steel belt has a sufficient strength to serve as a reinforcement core, when the toothed conveyor belt is used as an intermittent-feed conveyor, the mass of elements for carrying out an acceleration/deceleration motion can be significantly reduced as compared to the case of an intermittent-feed roller chain conveyor. As a result, drive elements such as a cam indexer and a servomotor can be of a relatively small capacity, thereby contributing to a reduction in the weight and cost of a conveyor apparatus.

Since a meshing-tooth mold can be positioned on the basis of holes which are formed in the steel belt at a pitch similar to that of the meshing teeth, the accuracy of the pitch of the meshing teeth formed on the belt body and the accuracy of the length of the toothed belt can be improved.

Preferably, bolt holes are formed at positions corresponding to those of the meshing teeth such that the bolt holes extend between inner and outer surfaces of the belt body. Bolt holes, each having a diameter smaller than that of the bolt hole formed in the belt body, are formed in the steel belt concentrically with the corresponding bolt holes formed in the belt body.

Accordingly, cut-and-joint operations for the belt body can be performed easily and accurately at the pitch of the meshing teeth.

Preferably, through-holes are formed in the steel belt at a laterally central portion and are longitudinally arranged at a pitch corresponding to that of the meshing teeth.

In this case, the steel belt becomes elastically deformable, and a firm integration of material for the belt body is established between the outer side and the inner side of the steel belt.

Preferably, the belt body and the steel belt embedded therein are longitudinally terminated such that the positions of the longitudinally opposite ends correspond to the bottom of a tooth space formed between the adjacent meshing teeth. An outer-side portion of the belt body extending between the end and a position corresponding to the bottom of the next tooth space is removed so as to expose the corresponding portion of the outer-side surface of the steel belt, thereby forming a link portion adjacent to each of the opposite ends. The two link portions oppose each other longitudinally and are linked together by means of a belt link piece such that the meshing teeth are arranged continuously. The belt link piece comprises an elastically deformable steel plate to be placed and bolted onto the exposed surface of the steel belt and a flexible belt link piece body integrated with the steel plate.

Accordingly, the belt length can be easily increased or decreased in an amount corresponding to multiples of a pitch between the adjacent meshing teeth. Thus, the bearing position of pulley engaged with the toothed belt does not need to be adjusted, thereby facilitating the installation or replacement of the toothed belt.

Preferably, conveyance attachments are fixedly attached onto the outer side of the belt body or the outer side of the belt link piece body by use of coupling bolts inserted through the corresponding bolt holes.

Accordingly, the conveyance attachments can be arranged at intervals, each corresponding to multiples of a pitch between the adjacent meshing teeth, according to the type of articles to be conveyed.

Since the conveyance attachment is fixedly attached onto the belt by use of the coupling bolts inserted through the corresponding bolt holes formed in the belt body and in the steel or by use of the coupling bolts inserted through the corresponding bolt holes formed in the belt link piece body and in the steel plate, the conveyance attachment can be easily removed.

Preferably, belt travel guide plates are fixedly attached onto the outer side of the belt body or the outer side of the belt link piece body by use of coupling bolts inserted through the corresponding bolt holes, and are guided by guide rails disposed on the opposite lateral sides of the belt body.

Accordingly, when the distance of conveyance is long, the belt travel guide plates prevent the toothed belt from slacking or meandering, thereby providing smooth conveyance.

The present invention further provides a coating removal jig for a toothed conveyor belt comprising a jig body, a clamp plate, a slider, and a push bolt. The jig body has a belt support surface on which are formed seating teeth for engagement with the meshing teeth of the belt body. The belt support surface supports an end portion of the toothed conveyor belt through engagement of the seating teeth with the meshing teeth of the end portion. The clamp plate is coupled to the jig body by use of clamp bolts in such a manner as to be movable toward or away from the belt support surface and clamps the belt body in cooperation with the belt support surface. The slider is supported on the jig body so as to slide toward or away from the end portion of the toothed conveyor belt clamped between the belt support surface and the clamp plate, and is provided with a coating-cutting blade facing the end portion. The push bolt is screwed into and extends through the jig body and is adapted to push the slider toward the end portion.

The coating removal jig enables easy, accurate cut-and-joint operations for the toothed belt at any position corresponding to the bottom of a tooth space between the adjacent meshing teeth.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Figure 1:
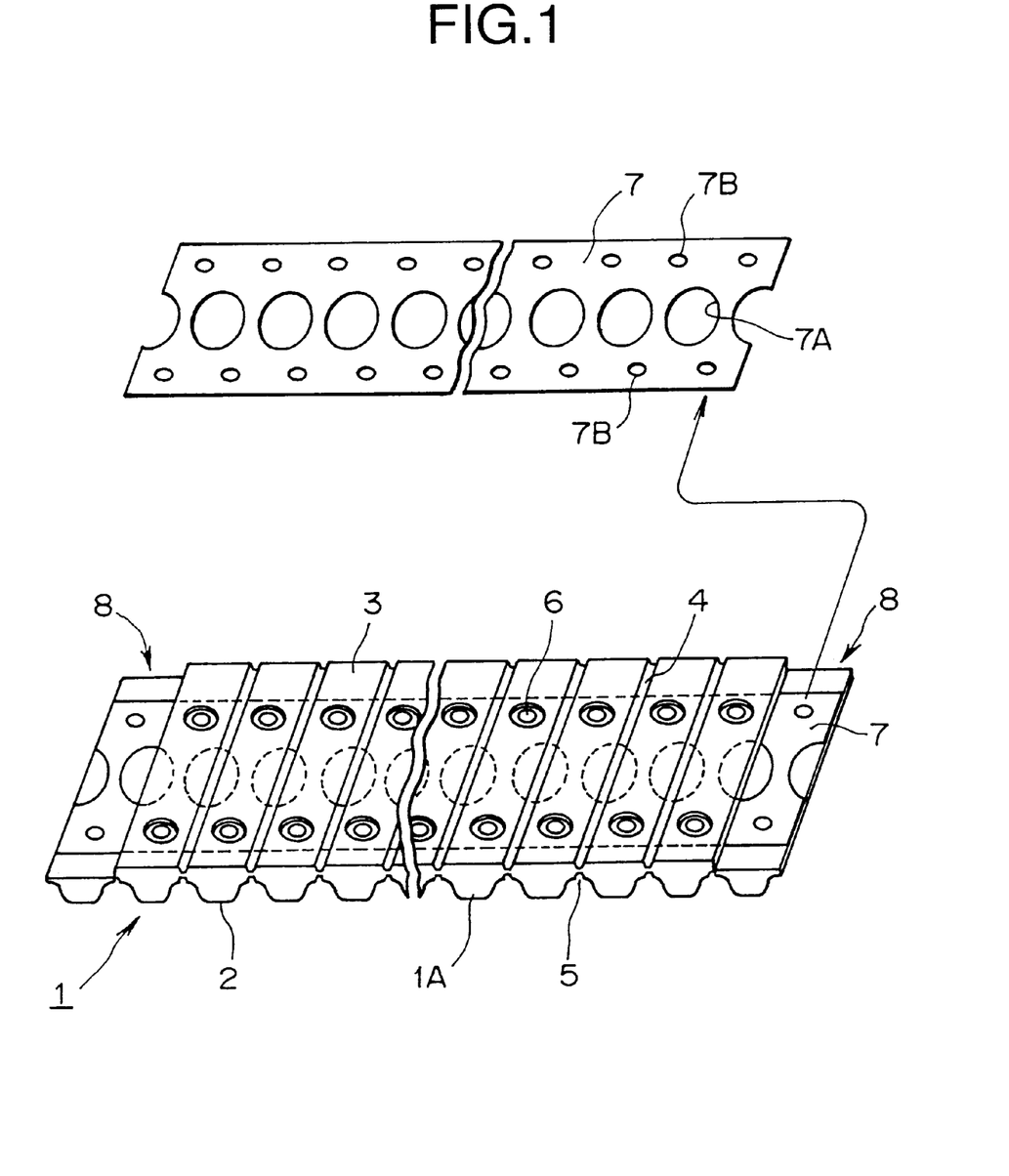
FIG. 1 is a partial perspective view showing an embodiment of a toothed conveyor belt according to the present invention.

Embodiments of the present invention will now be described in detail with reference to the drawings. FIG. 1 is a partial perspective view showing an embodiment of a toothed belt according to the present invention. A belt body 1A of a toothed belt 1 is formed of a flexible, elastic material such as rubber or an urethane resin. A number of meshing teeth 2 for meshing with a toothed pulley are formed on the surface of the belt body 1A located on the inner side of the toothed belt 1 whose opposite ends are connected to form an endless loop. A flat surface 3 is formed on the outer side of the belt body 1.

The flat surface 3 is equally divided along the direction of conveyance of the toothed belt 1 by grooves 4 having a semicircular or U-shaped cross section and extending across the width of the toothed belt 1. The positions of the grooves 4 correspond to the bottoms of tooth spaces formed between the adjacent meshing teeth 2. In other words, the flat surface 3 is equally divided at the arrangement pitch of the meshing teeth 2. Further, grooves 5 having a semicircular or U-shaped cross section are formed at the bottoms of the tooth spaces. The grooves 4 and 5 improve the flexure property of the belt body 1A.

Pairs of laterally opposed bolt holes 6 extend through the belt body 1A between the inner and outer sides of the belt body 1A and are equally arranged in the direction of conveyance at the arrangement pitch of the meshing teeth 2.

An elastically deformable, thin steel belt 7 is embedded in the belt body 1A and serves as a reinforcement core.

Circular or elliptical through-holes 7A are formed in the steel belt 7 at a laterally central portion and are longitudinally arranged at a pitch similar to that of the meshing teeth 2, in order to make the steel belt 7 more elastically deformable and to establish a firm integration of material for the belt body 1A between the outer side and the inner side.

The steel belt 7 is embedded in the belt body 1A such that the center of each through-hole 7A is aligned with the grooves 4 and 5 located above and under the through-hole 7A. Bolt holes 7B are formed in the steel belt 7 concentrically with the bolt holes 6 formed in the belt body 1A.

According to the present embodiment, the bolt holes 7B are used as positioning holes for positioning a meshing-tooth mold in the manufacture of the toothed belt 1, thereby improving the accuracy of the pitch of the meshing teeth 2 formed on the belt body 1A and the accuracy of the length of the toothed belt 1.

The positioning holes may be formed in the steel belt 7 separately from the bolt holes 7B.

As shown in FIG. 1, the toothed belt 1 of the present embodiment is formed to a predetermined length. A link portion 8 is formed at each of the longitudinally opposite ends of the toothed belt 1. Coating of rubber or a urethane resin on the side of the flat surface 3 is removed from the upper surface of the link portion 8 such that the upper surface of the steel belt 7 is exposed. Specifically, the coating is removed over a distance corresponding to a half the pitch of the meshing teeth 2 such that the surface of the coating becomes substantially flush with the upper surface of the steel belt 7.

By linking the link portions of the toothed belt 1 by means of any of belt link pieces 9A to 9D of various lengths as shown in FIGS. 2A–2D the toothed belt 1 is formed into the shape of an endless loop of an arbitrary length. Also, a plurality of the toothed belts 1 may be linked together in the same manner to obtain a long endless belt.

Each of the belt link pieces 9A to 9D includes an elastically deformable thin steel plate 10 and a belt link piece body 11. The steel plate 10 has holes 10A and bolt holes 10B formed therein in an arrangement similar to that employed for the steel belt 7. As in the case of the belt body 1A, the belt link piece body 11 is formed of rubber or a urethane resin and is thus flexible.

Figure 2A:
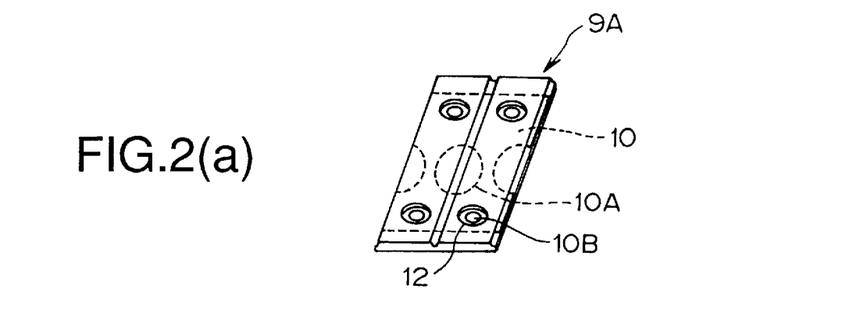
FIGS. 2A–2D are perspective views showing various belt link pieces for use in the toothed conveyor belt of FIG. 1.
Figure 3:
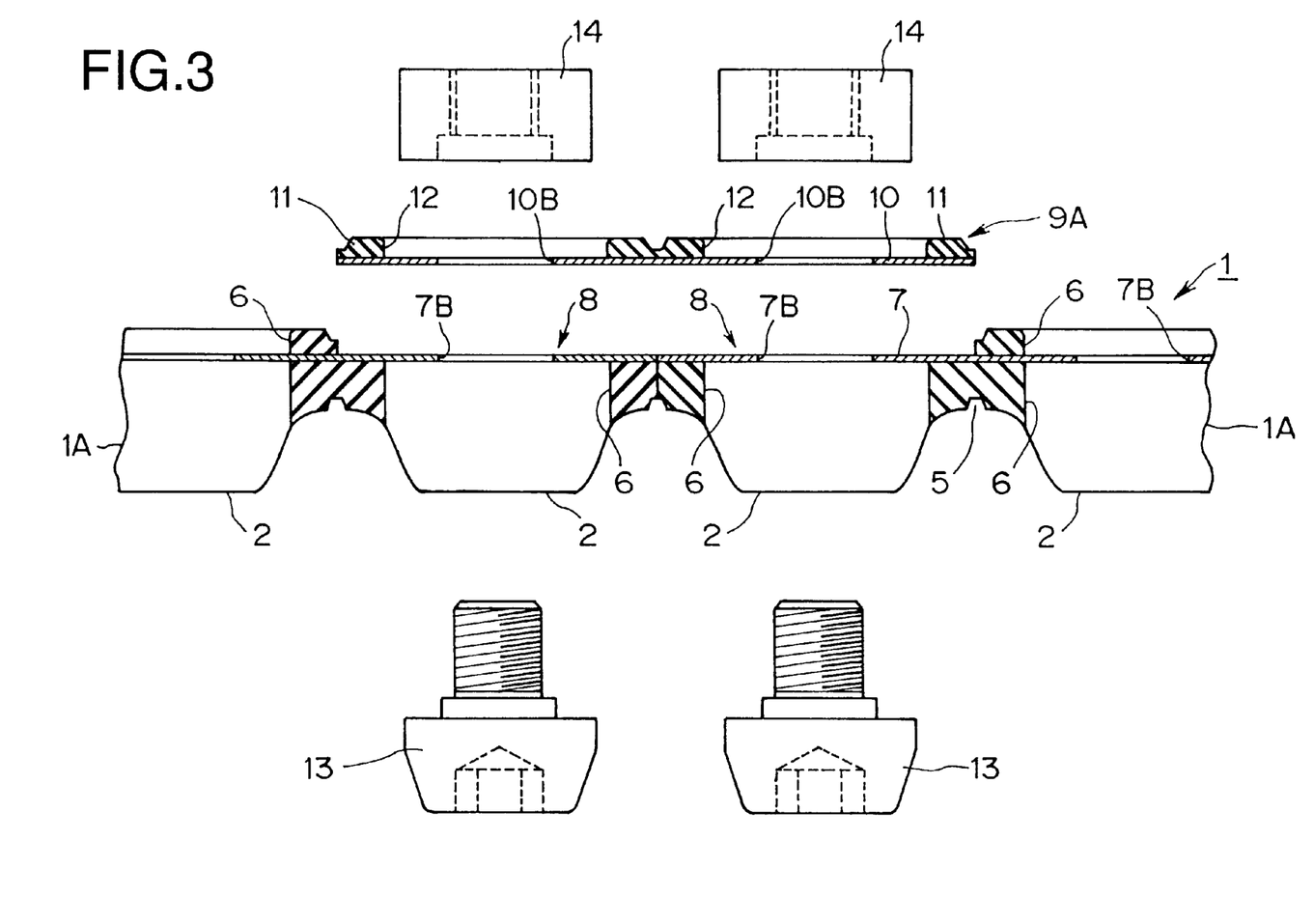
FIG. 3 is an exploded sectional view showing link portions of the toothed conveyor belt of FIG. 1.
Figure 4:
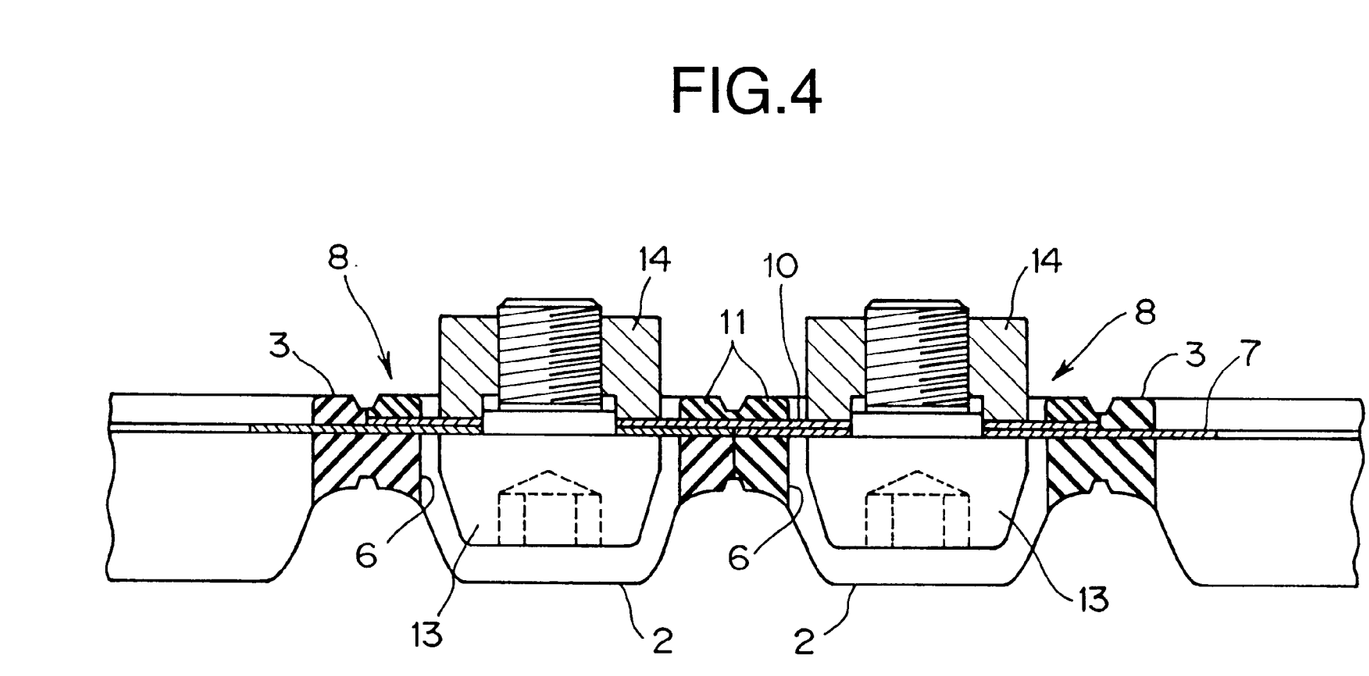
FIG. 4 is a sectional view showing the linked link portions of the toothed conveyor belt of FIG. 1.

FIG. 3 is an exploded sectional view showing how the link portions 8 of the toothed belt 1 are linked together by use of the belt link piece 9A of FIG. 2A. FIG. 4 is a sectional view showing the link portions 8 linked together. As shown in FIG. 4, when the link portions 8 of the toothed belt 1 are abutted against each other at the end surfaces thereof, the meshing teeth 2 formed on the inner side of the corresponding link portions 8 are arranged such that the pitch therebetween becomes equal to that between other meshing teeth 2.

Then, the belt link piece 9A is placed on both link portions 8 such that the steel plate 10 of the belt link piece 9A comes in contact with the exposed steel belt 7 of the link portions 8. As a result, as shown in FIG. 4, the outer-side surface of the belt link piece 9A becomes substantially flush with the flat surface 3 of the belt body 1A.

Bolt holes 12, each having a diameter substantially identical to that of the bolt hole 6 formed in the belt body 1A, are formed in the belt link body 11 concentrically with bolt holes 10B formed in the steel plate 10. Each coupling bolt 13 is inserted, from the side of the meshing teeth 2, through the bolt holes 6, 7B, 10B, and 12. Nuts 14 are screw-engaged with the corresponding coupling bolts 13 from the side of the belt link piece 9A and are tightened.

The diameter of the coupling bolt 13 and that of the nut 14 are such that the coupling bolt 13 and the nut 14 are received within the bolt hole 6 formed in the belt body 1A and the bolt hole 12 formed in the belt link piece body 11, respectively. Through engagement of the coupling bolts 13 and the nuts 14, the steel belt 7 and the steel plate 10 are firmly connected together.

Figure 2B:
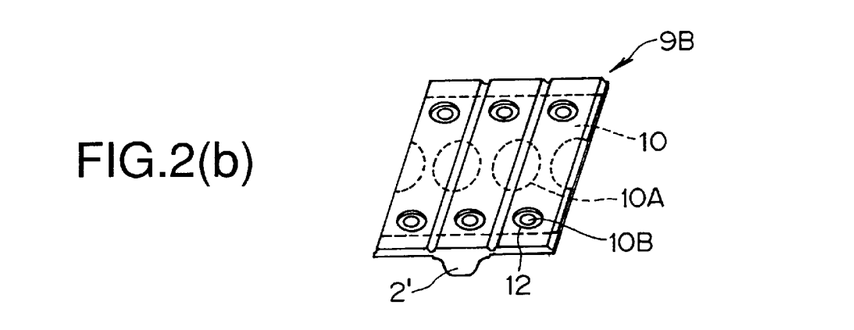
Figure 5:
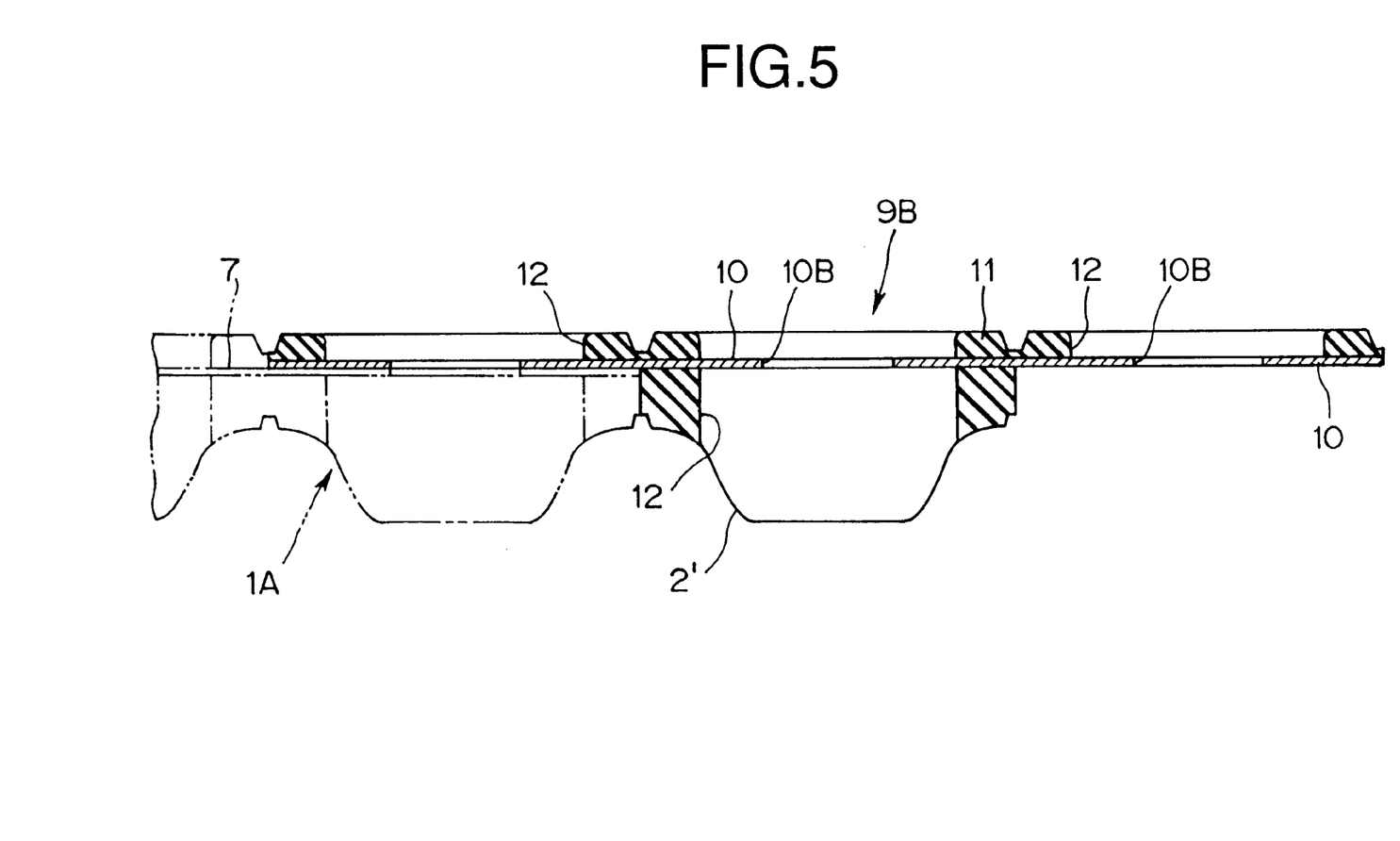
FIG. 5 is a sectional view showing a belt link piece equipped with a meshing tooth.

FIG. 5 is a sectional view showing the structure of a belt link piece 9B of FIG. 2B. The belt link piece 9B has a length corresponding to three pitches of the meshing teeth 2 of the belt body 1A. The opposite end portions of the belt link piece 9B as viewed in the direction of conveyance have a structure similar to that of the belt link piece 9A of FIGS. 3 and 4.

A meshing tooth 2' having the same profile as that of the meshing tooth 2 is formed as a portion of the belt link piece body 11 at a central portion of the belt link piece 9B as viewed in the direction of conveyance. The steel plate 10 is exposed on both sides of the meshing tooth 2' as viewed in the direction of conveyance. The exposed steel plate 10 is placed and bolted onto the exposed steel belt 7 of the link portion 8 of the belt body 1A as in the case of the belt link piece 9A.

Figure 2C:
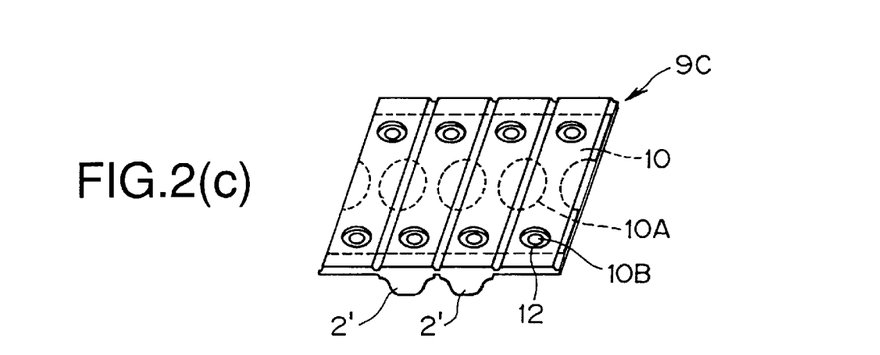
Figure 2D:
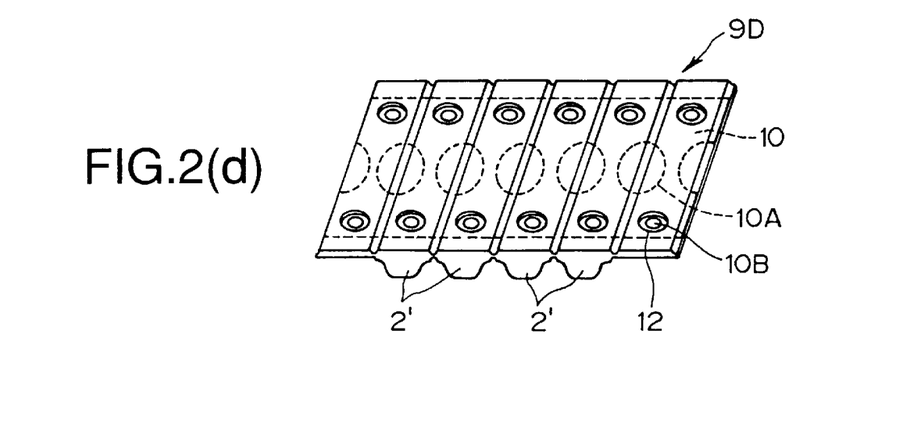

Belt link pieces 9C and 9D of FIGS. 2C and 2D are basically similar in structure to the belt link piece 9B except that the number of the meshing teeth 2' is different. When the toothed belt 1 of FIG. 1 is to be looped, the length of the toothed belt 1 can be adjusted by use of a belt link piece having an optimum length. In addition to the belt link pieces shown in FIG. 2, belt link pieces having various numbers of the meshing teeth can be manufactured.

Figure 6:
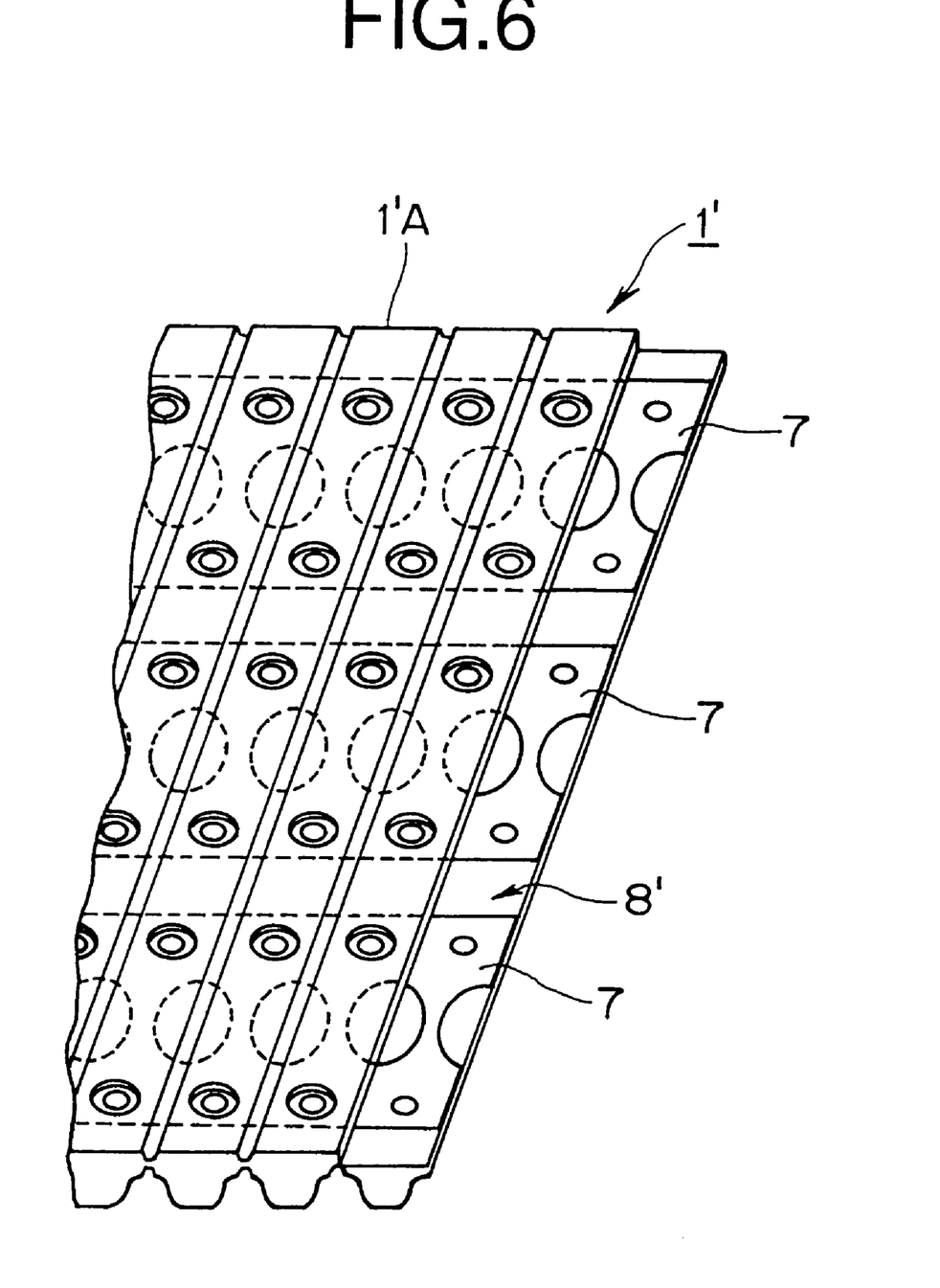
FIG. 6 is a partial perspective view showing another embodiment of the toothed conveyor belt according to the present invention.

FIG. 6 is a partial perspective view showing another embodiment of a toothed conveyor belt according to the present invention. In the present embodiment, a toothed belt 1' includes a belt body 1'A and three steel belts 7 used in the toothed belt 1 of FIG. 1. The three steel belts 7 are arranged widthwise in three rows while being separated from each other, and are embedded in the belt body 1'A.

The belt body 1'A has about three times the width of the belt body 1A of FIG. 1. Link portions 8' formed at the longitudinally opposite ends of the belt body 1'A are linked together by bolting thereto an unillustrated belt link piece corresponding to the belt link piece 9A, 9B, 9C, or 9D shown in FIGS. 2A, 2B, 2C, and 2D, respectively. The belt link piece includes a belt link piece body and three steel plates 10 used in the belt link piece 9A, 9B, 9C, or 9D. The belt link piece body has a width substantially identical to that of the belt body 1'A. The three steel plates 10 are embedded in the belt link piece body and are arranged in three rows.

Figure 7:
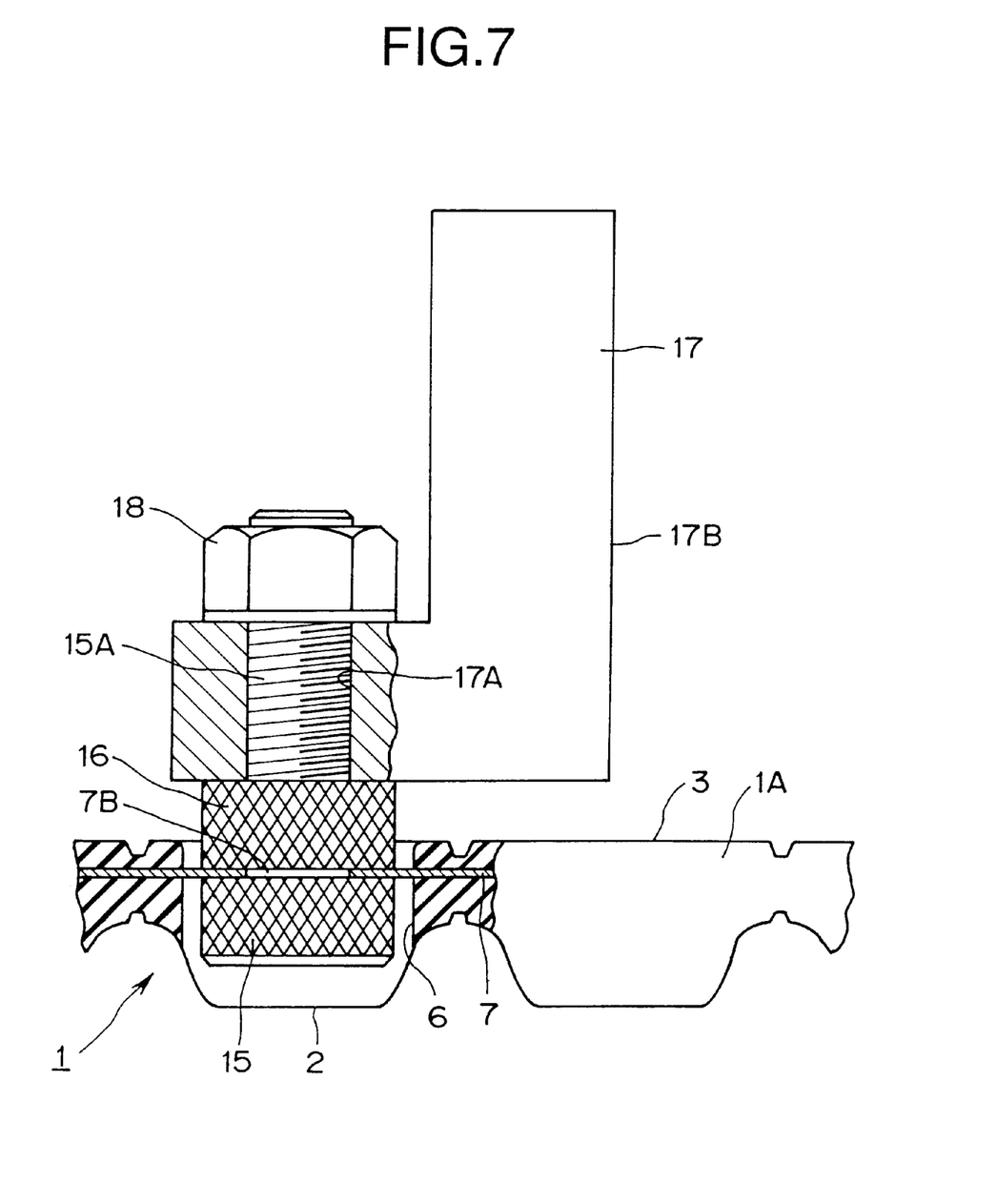
FIG. 7 is a sectional view showing still another embodiment of the toothed conveyor belt according to the present invention and illustrating the installation of a conveyance attachment onto the belt.

FIG. 7 shows still another embodiment of a toothed conveyor belt according to the present invention. Each conveyance attachment 17 is fixedly attached onto the toothed conveyor belt in the following manner. A coupling bolt 15 is inserted through the bolt holes 6 and 7B formed in the toothed belt 1 of FIG. 1. A nut 16 is screwed onto the coupling bolt 15 to thereby fix the coupling bolt 15 to the steel belt 7, so that a screw portion 15A of the coupling bolt 15 projects from the outer side of the toothed belt 1. The projecting screw portion 15A is inserted through a coupling bolt hole 17A formed in the conveyance attachment 17. Then, a nut 18 is screwed onto the screw portion 15A to fix the conveyance attachment 17.

The conveyance attachment 17 is attached onto the belt body 1A such that a push surface 17B faces the direction of conveyance of the toothed belt 1. The push surface 17B abuts, from behind, an article conveyed on the flat surface 3 located on the outer side of the belt body 1A, thereby performing reliable conveyance of the article.

The conveyance attachments 17 may be attached at appropriate intervals according to the shape or weight of articles to be conveyed. The minimum interval corresponds to the pitch between the adjacent meshing teeth 2. The conveyance attachment 17 can be attached onto not only the belt body 1A but also a belt link piece having the meshing tooth (teeth) 2' such as the belt link pieces 9B, 9C, and 9D shown in FIGS. 2B, 2C, and 2D, respectively.

According to the present embodiment, the conveyance attachment 17 assumes the form of a pusher; however, it may assume different forms according to kinds of articles to be conveyed. For example, when granular articles are to be conveyed, the conveyance attachment 17 may assume the form of a bucket.

Figure 8:
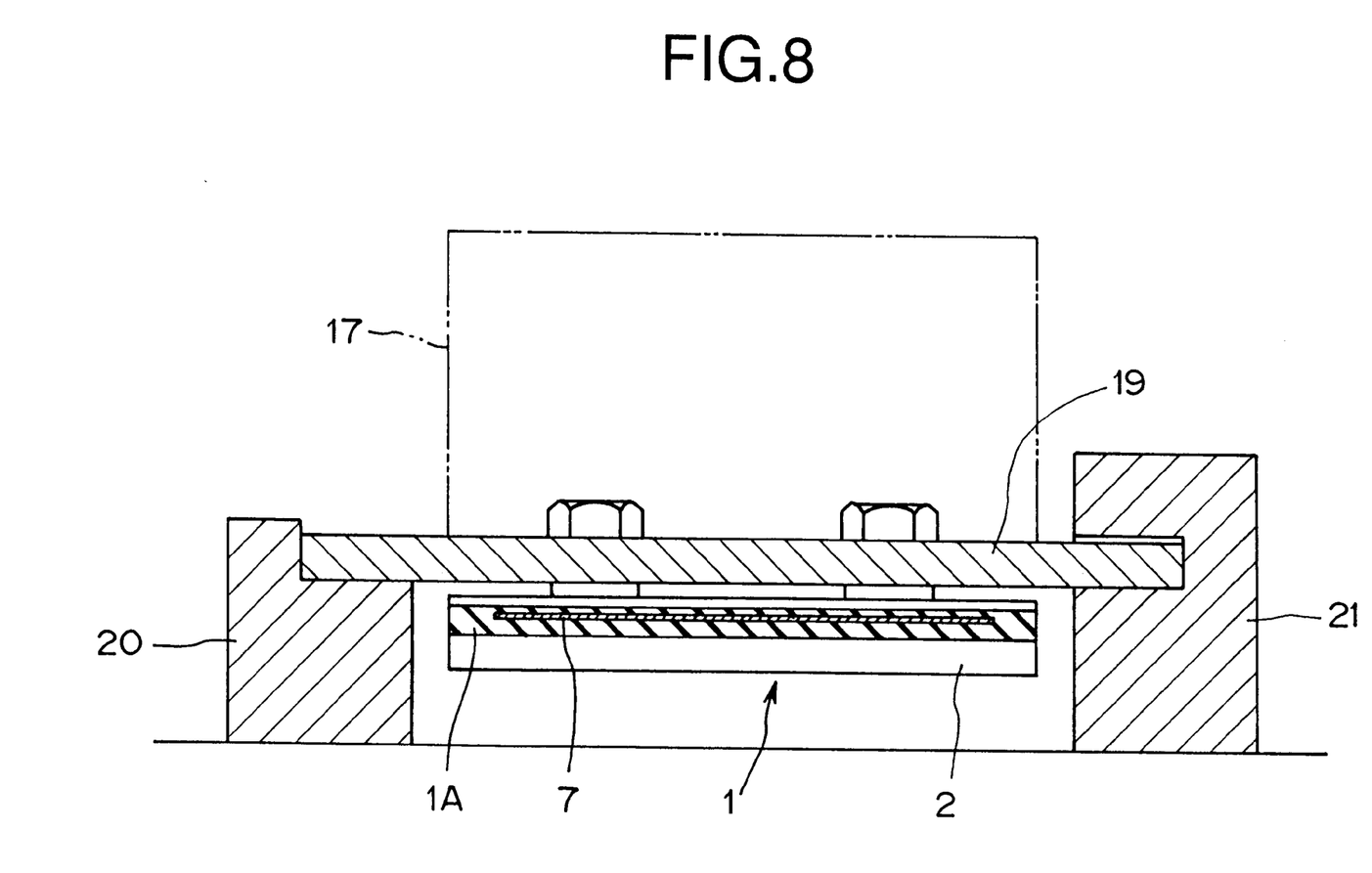
FIG. 8 is a transverse sectional view showing yet another embodiment of the toothed conveyor belt according to the present invention and illustrating the installation of a belt travel guide plate onto the belt.

FIG. 8 shows yet another embodiment of a toothed conveyor belt according to the present invention. A belt travel guide plate 19 is bolted onto the outer side of the toothed belt 1 in a manner similar to the case of the conveyance attachment 17 of FIG. 7.

The belt travel guide plate 19 projects laterally from the belt body 1A of the toothed belt 1. Guide rails 20 and 21 are disposed on the laterally opposite sides of the toothed belt 1 and are fixedly attached to an unillustrated conveyor frame on which the toothed belt 1 is provided. The travel guide plate 19 is guided by the guide rails 20 and 21, thereby preventing meandering travel of the toothed belt 1.

The belt travel guide plate 19 is located between the conveyance attachments 17 neighboring in the direction of conveyance.

As in the case of the conveyance attachment 17, the belt travel guide plate 19 may be attached onto a belt link piece having the meshing tooth (teeth) 2' such as the belt link pieces 9B, 9C, and 9D shown in FIGS. 2B, 2C, and 2D, respectively.

Figure 9:
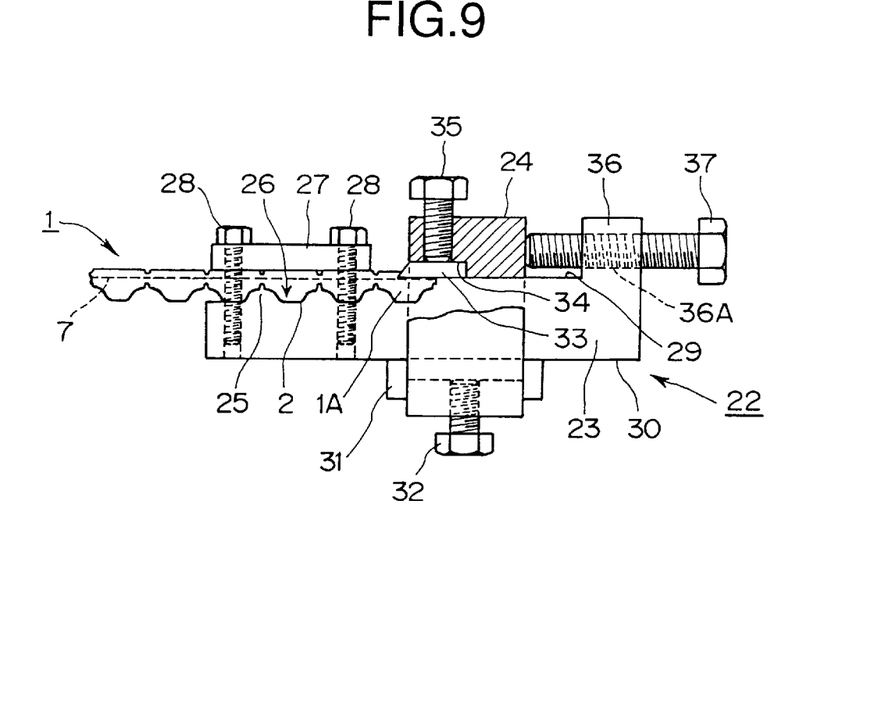
FIG. 9 is a side view showing an embodiment of a coating removal jig for a toothed conveyor belt according to the present invention.
Figure 10:
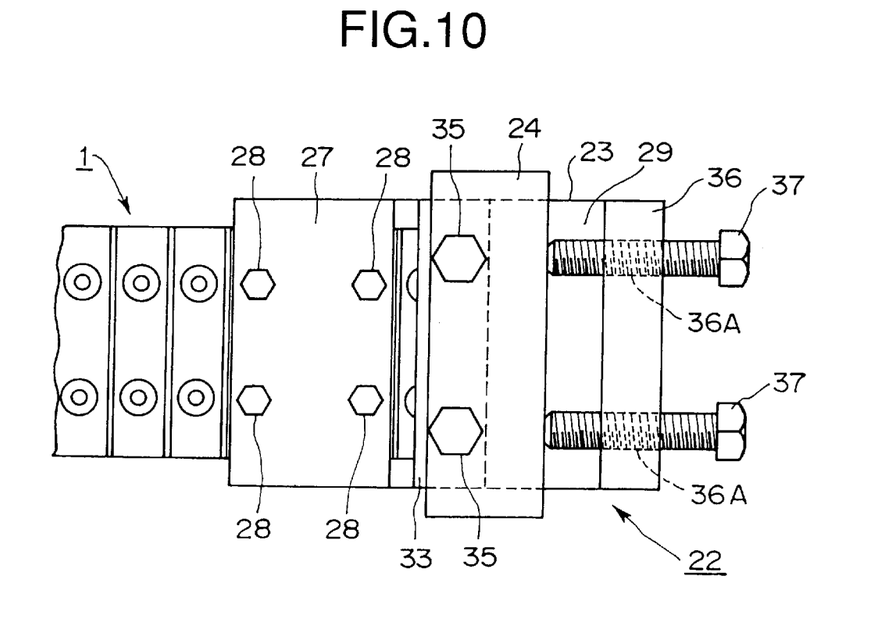
FIG. 10 is a plan view showing the coating removal jig of FIG. 9.

FIG. 9 is a side view showing an embodiment of a coating removal jig for a toothed belt according to the present invention. FIG. 10 is a plan view of the coating removal jig. A coating removal jig 22 for a toothed belt is applied to a case where the toothed belt 1 of FIG. 1 undergoes cut-and-joint operations at a position other than the link portion 8 shown in FIG. 1, and is used to form, at a cut end portion, a link portion similar to the link portion 8.

The coating removal jig 22 includes a jig body 23 and a slider 24, which is slidably attached to the jig body 23. Seating teeth 25 are formed at a tip end portion of the jig body 23 and form a belt support surface 26 thereon.

The seating teeth 25 are profiled so as to engage with the meshing teeth 2 formed on the belt body 1A of the toothed belt 1 of FIG. 1.

A clamp plate 27 faces the belt support surface 26 and is coupled to the jig body 23 by means of clamp bolts 28. By rotating the clamp bolts 28, the clamp plate 27 is moved toward or away from the belt support surface 26.

The slider 24 slides on a guide surface 29 which extends away from the belt support surface 26 (i.e., towards the right in FIG. 9). A guide shoe 31 is interposed between the slider 24 and a flat bottom surface 30 of the jig body 23.

Adjustment bolts 32 are screwed into the slider 24 so as to press the guide shoe 31 against the bottom surface 30, thereby eliminating a play between the jig body 23 and the slider 24.

The slider 24 is provided with a coating-cutting blade 33 such that the cutting edge of the blade 33 projects toward the clamp plate 27. The coating-cutting blade 33 is received in a recess 34 formed in the slider 24 such that a portion of the bottom surface thereof comes in contact the guide surface 29.

Adjustment bolts 35 are screwed into the slider 24 such that tips thereof project into the recess 34 and abut the top surface of the coating-cutting blade 33, and are tightened/loosened in an adjustive manner so that the coating-cutting blade 33 can smoothly slide on the guide surface 29.

A bolt support portion 36 is formed on the jig body 23 at an end opposite the seating teeth 25 in such a manner as to project upward. Push bolts 37 are screwed into respective threaded holes 36A which extend through the bolt support portion 36 in the longitudinal direction of the jig body 23.

The above-described coating removal jig 22 is used in the following manner. The seating teeth 25 of the jig body 23 are engaged with the meshing teeth 2 of a cut end portion of the toothed belt 1, while the adjustment bolts 32 and 35 are adjusted so as to eliminate play of the slider 24 and that of the coating-cutting blade 33. The clamp bolts 28 are tightened so as to press the clamp plate 27 against the outer-side surface of the belt body 1A, thereby fixing the jig body 23 in place.

The push bolts 37 are rotated so as to slide the slider 24 toward the cut end of the toothed belt 1, thereby moving the coating-cutting blade 33 toward the cut end. The cutting edge of the coating-cutting blade 33 cuts off a portion of the belt body 1A from the outer-side surface of the steel belt 7, thereby exposing the outer-side surface of the steel belt 7 and thus forming the cut end portion of the toothed belt 1 into a new link portion.

According to the present embodiment, two kinds of the adjustment bolts 32 and 35 are provided in order to prevent the play of the slider 24 and the coating-cutting blade 23 which might otherwise occur during their sliding on the jig body 23, thereby improving the profile of a formed link portion. Also, the guide shoe 31 is interposed between the jig body 23 and the slider 24. However, these adjustment bolts 32 and 35 and the guide shoe 31 may be omitted when the sliding portions between the slider 24 and the jig body 23 and between the coating-cutting blade 33 and the jig body 23 are highly accurately finished.

The above-described coating removal jig 22 is applied to the toothed belt 1 in which only a single steel belt 7 as shown in FIG. 1 is embedded. However, by use of the coating removal jig 22 having a wider jig body and a wider slider, a new link portion can be formed for a toothed belt in which a plurality of rows of steel belts are embedded in a belt body as shown in FIG. 6.

Obviously, numerous modifications and variations of the present invention are possible in light of the above teachings. It is therefore to be understood that within the scope of the appended claims, the present invention may be practiced otherwise than as specifically described herein.

What is claimed is:

1. A toothed conveyor belt for conveying articles on an outer side thereof comprising a pair of interconnected link portions having:

a flexible belt body, said flexible belt body having a flat outer side thereof and meshing teeth on an inner side thereof, said teeth having a tooth pitch for meshing with a toothed pulley;

an elastically deformable steel belt embedded in said belt body and extending in the longitudinal direction of said belt body parallel to said flat outer side, said belt having a coating with a thickness between said steel belt and said flat outer side;

said belt having bolt holes extending through said meshing teeth, said steel belt and said coating;

each of said link portions comprising a terminal splice area corresponding in length to said tooth pitch in which there is no coating;

a belt link piece corresponding in length to twice said tooth pitch and overlying the terminal splice areas of said pair of interconnected link portions;

said link piece comprising an elastically deformable steel plate and having a thickness corresponding to the thickness of said coating, and having bolt holes in registry with said bolt holes extending through said meshing teeth and said steel belt in said terminal splice areas; and said link piece interconnecting said link portions by being fastened to said steel belt.

2. A toothed conveyor belt comprising:

a flexible belt body for conveying articles on an outer side thereof, said flexible belt body having meshing teeth formed on an inner side thereof for meshing with a toothed pulley;

an elastically deformable steel belt embedded in said belt body and extending in the longitudinal direction of said belt body;

said flexible belt body having bolt holes at positions corresponding to those of the meshing teeth such that the bolt holes extend between inner and outer surfaces of said belt body; and said steel belt having bolt holes, each having a diameter smaller than that of the bolt hole formed in said belt body, said steel belt holes being positioned concentrically with the corresponding bolt holes formed in said belt body.

3. A toothed conveyor belt according to claim 2, wherein through-holes are formed in said steel belt at a laterally central portion and are longitudinally arranged at a pitch corresponding to that of the meshing teeth.

4. A toothed conveyor belt comprising:

a flexible belt body for conveying articles on an outer side thereof, said flexible belt body having meshing teeth formed on an inner side thereof for meshing with a toothed pulley;

an elastically deformable steel belt embedded in said belt body and extending in the longitudinal direction of said belt body;

said belt body and said steel belt embedded therein being longitudinally terminated with opposite ends such that the positions of longitudinally opposite ends correspond to the bottom of a tooth space formed between the adjacent meshing teeth;

an outer-side portion of said belt body extending between the end and a position corresponding to the bottom of the next tooth space being removed so as to expose a corresponding portion of the outer-side surface of said steel belt, thereby forming a link portion adjacent to each of the opposite ends;

the two link portions opposing each other longitudinally; and a belt link piece linking said two link portions together such that the meshing teeth are arranged continuously;

said belt link piece comprising an elastically deformable steel plate placed and bolted onto the exposed surface of said steel belt, and a flexible belt link piece body integrated with the steel plate.

5. A toothed conveyor belt according to claim 2, wherein said belt body and said steel belt embedded therein are longitudinally terminated such that the positions of longitudinally opposite ends correspond to the bottom of a tooth space formed between the adjacent meshing teeth;

an outer-side portion of said belt body extending between the end and a position corresponding to the bottom of the next tooth space is removed so as to expose a corresponding portion of the outer-side surface of said steel belt, thereby forming a link portion adjacent to each of the opposite ends;

the two link portions oppose each other longitudinally and are linked together by means of a belt link piece such that the meshing teeth are arranged continuously; and the belt link piece comprises an elastically deformable steel plate to be placed and bolted onto the exposed surface of said steel belt, and a flexible belt link piece body integrated with the steel plate.

6. A toothed conveyor belt according to claim 3, wherein said belt body and said steel belt embedded therein are longitudinally terminated such that the positions of longitudinally opposite ends correspond to the bottom of a tooth space formed between the adjacent meshing teeth;

an outer-side portion of said belt body extending between the end and a position corresponding to the bottom of the next tooth space is removed so as to expose a corresponding portion of the outer-side surface of said steel belt, thereby forming a link portion adjacent to each of the opposite ends;

the two link portions oppose each other longitudinally and are linked together by means of a belt link piece such that the meshing teeth are arranged continuously; and the belt link piece comprises an elastically deformable steel plate to be placed and bolted onto the exposed surface of said steel belt, and a flexible belt link piece body integrated with the steel plate.

7. A toothed conveyor belt according to claim 2, wherein conveyance attachments are fixedly attached onto the outer side of said belt body by use of coupling bolts inserted through the corresponding bolt holes.

8. A toothed conveyor belt according to claim 3, wherein conveyance attachments are fixedly attached onto the outer side of said belt body by use of coupling bolts inserted through the corresponding bolt holes.

9. A toothed conveyor belt according to claim 4, wherein conveyance attachments are fixedly attached onto the outer side of said belt body or the outer side of the belt link piece body by use of coupling bolts inserted through the corresponding bolt holes.

10. A toothed conveyor belt according to claim 5, wherein conveyance attachments are fixedly attached onto the outer side of said belt body or the outer side of the belt link piece body by use of coupling bolts inserted through the corresponding bolt holes.

11. A toothed conveyor belt according to claim 6, wherein conveyance attachments are fixedly attached onto the outer side of said belt body or the outer side of the belt link piece body by use of coupling bolts inserted through the corresponding bolt holes.

12. A toothed conveyor belt according to claim 2, wherein belt travel guide plates are fixedly attached onto the outer side of said belt body by use of coupling bolts inserted through the corresponding bolt holes, and are guided by guide rails disposed on the opposite lateral sides of said belt body.

13. A toothed conveyor belt according to claim 3, wherein belt travel guide plates are fixedly attached onto the outer side of said belt body by use of coupling bolts inserted through the corresponding bolt holes, and are guided by guide rails disposed on the opposite lateral sides of said belt body.

14. A toothed conveyor belt according to claim 4, wherein belt travel guide plates are fixedly attached onto the outer side of said belt body or the outer side of the belt link piece body by use of coupling bolts inserted through the corresponding bolt holes, and are guided by guide rails disposed on the opposite lateral sides of said belt body.

15. A toothed conveyor belt according to claim 5, wherein belt travel guide plates are fixedly attached onto the outer side of said belt body or the outer side of the belt link piece body by use of coupling bolts inserted through the corresponding bolt holes, and are guided by guide rails disposed on the opposite lateral sides of said belt body.

16. A toothed conveyor belt according to claim 6, wherein belt travel guide plates are fixedly attached onto the outer side of said belt body or the outer side of the belt link piece body by use of coupling bolts inserted through the corresponding bolt holes, and are guided by guide rails disposed on the opposite lateral sides of said belt body.

* * * * *